United States Patent
Sugawa

(10) Patent No.: US 10,787,063 B2
(45) Date of Patent: Sep. 29, 2020

(54) GLASS RUN

(71) Applicant: TOYODA GOSEI CO., LTD., Kiyosu-shi, Aichi-ken (JP)

(72) Inventor: Hiroshi Sugawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 172 days.

(21) Appl. No.: 16/111,529

(22) Filed: Aug. 24, 2018

(65) Prior Publication Data

US 2019/0061486 A1 Feb. 28, 2019

(30) Foreign Application Priority Data

Aug. 31, 2017 (JP) ................. 2017-166781

(51) Int. Cl.
| | | |
|---|---|---|
| *E06B 7/16* | (2006.01) | |
| *B60J 5/04* | (2006.01) | |
| *B60J 10/26* | (2016.01) | |
| *B60J 10/76* | (2016.01) | |
| *B60J 10/32* | (2016.01) | |
| *B60J 10/21* | (2016.01) | |

(52) U.S. Cl.
CPC ............ *B60J 5/0402* (2013.01); *B60J 10/21* (2016.02); *B60J 10/26* (2016.02); *B60J 10/32* (2016.02); *B60J 10/76* (2016.02)

(58) Field of Classification Search
CPC . B60J 5/0402; B60J 10/21; B60J 10/26; B60J 10/76; B60J 10/32
USPC ....................................................... 49/479.1
See application file for complete search history.

(56) References Cited

U.S. PATENT DOCUMENTS

| | | | | |
|---|---|---|---|---|
| 6,393,766 | B2* | 5/2002 | Nozaki ..................... | B60J 10/24 |
| | | | | 49/475.1 |
| 7,320,199 | B2* | 1/2008 | Ueda ........................ | B60J 10/21 |
| | | | | 49/479.1 |
| 10,294,714 | B2* | 5/2019 | Massey ..................... | E06B 7/16 |
| 10,336,169 | B2* | 7/2019 | Kanphade ................ | B60J 10/21 |
| 2015/0360547 | A1* | 12/2015 | Ogawa ................... | B60J 5/0479 |
| | | | | 49/368 |
| 2017/0259656 | A1* | 9/2017 | Sia, Jr. ..................... | B60J 10/32 |
| 2018/0141421 | A1* | 5/2018 | Blottiau ................... | B60J 10/17 |
| 2018/0266173 | A1* | 9/2018 | Mizutani ................ | B60J 10/277 |

(Continued)

FOREIGN PATENT DOCUMENTS

JP 2004-155365 A 6/2004

*Primary Examiner* — Jerry E Redman
(74) *Attorney, Agent, or Firm* — Posz Law Group, PLC

(57) ABSTRACT

A glass run includes a main body corresponding to an extrusion molding part and a glass run corner part, formed with a vehicle outside groove part between a vehicle outside sidewall and a vehicle outside cover lip, the main body being formed with a vehicle inside groove part between a vehicle inside sidewall and a vehicle inside cover lip, and tips of a door frame being inserted into the vehicle outside groove part and the vehicle inside groove part. In the glass run corner part, an engagement bead part is formed in at least one side surface, which faces the vehicle outside groove part, of the vehicle outside sidewall and the vehicle outside cover lip, a long caulking sponge member is inserted into the vehicle outside groove part, and the engagement bead part compresses an end part of the caulking sponge member to be engaged with the end part.

7 Claims, 6 Drawing Sheets

(56) References Cited

U.S. PATENT DOCUMENTS

2019/0016201 A1* 1/2019 Schoch .................... B60J 10/32
2019/0061486 A1* 2/2019 Sugawa .................... B60J 10/21

* cited by examiner

RELATED ART

GLASS RUN

CROSS-REFERENCE TO RELATED APPLICATION(S)

This application is based upon and claims the benefit of priority from Japanese Patent Application No. 2017-166781, filed on Aug. 31, 2017, the entire contents of which are incorporated herein by reference.

BACKGROUND

1. Field of the Invention

The present invention relates a glass run which guides an elevating and lowering of a door glass and seals a door glass, and has an extrusion molding part and a corner part.

2. Description of the Related Art

As illustrated in FIG. 9, a glass run 110 which guides an elevating and lowering of a door glass 5 is attached in an inner circumference of a door frame 2 of a door 1 of a vehicle.

In the related art, as illustrated in FIG. 9, the glass run 110 is attached inside a channel 103 of the door frame 2, and guides the elevating and lowering of the door glass 5 and seals a space between the door glass 5 and the door frame 2.

As illustrated in FIG. 8, the glass run 110 includes an extrusion molding part 111 which is molded by extrusion molding and a glass run corner part 112 which is connected with the extrusion molding part 111 and is molded by a die molding. The extrusion molding part 111 forms a glass run upper side part 115 and a glass run vertical side part 114.

The glass run upper side part 115 is attached in a door frame upper side part 2b, and the glass run vertical side part 114 is attached in a door frame vertical side part 2a The glass run upper side part 115 and the glass run vertical side part 114 are connected by the glass run corner part 112 formed in accordance with a shape of a door frame corner part 2h by die molding.

Incidentally, the sealing between the door 1 and a vehicle body is performed by a door weather strip (not illustrated) attached in a door panel and the outer circumference of the door frame 2 and/or an opening trim weather strip (not illustrated) which is attached in a flange of the opening part of the vehicle body.

As illustrated in FIG. 10, the extrusion molding part 111 of the main body of the glass run 110 has a substantially U-shaped cross section formed by a vehicle outside sidewall 120, a vehicle inside sidewall 130, and a bottom wall 140. A vehicle outside seal lip 121 is provided to extend from the vicinity of the tip of the vehicle outside sidewall 120 toward the inside of the substantially U-shaped cross section of the main body. In addition, also in the vehicle inside sidewall 130, a vehicle inside seal lip 131 is provided to extend from the vicinity of the tip thereof toward the inside of the substantially U-shaped cross section. Further, a vehicle outside cover lip 123 is formed in parallel with the outer surface of the vehicle outside sidewall 120 from the vicinity of the tip of the vehicle outside sidewall 120, and a vehicle inside cover lip 133 is formed in parallel with the outer surface of the vehicle inside sidewall 130 from the vicinity of the tip of the vehicle inside sidewall 130.

The vehicle outside sidewall 120, the vehicle inside sidewall 130, and the bottom wall 140 of the main body of the glass run 110 are fitted to a flange portion of a door outer panel 2c and a door inner panel 2e of the door frame 2.

At that time, the flange portion of the door outer panel 2c is inserted between the vehicle outside sidewall 120 and the vehicle outside cover lip 123, and the flange portion of the door inner panel 2e is inserted between the vehicle inside sidewall 130 and the vehicle inside cover lip 133.

In the glass run corner part 112, a gap is easily formed between the vehicle outside sidewall 120 and the vehicle outside cover lip 123 of the glass run 110, and a gap is easily formed from the flange portion of the door inner panel 2e inserted therebetween, which causes faults such as a wind noise or penetration of rainwater. For this reason, a non-drying sealer is inserted between the vehicle outside sidewall 120 and the vehicle outside cover lip 123, and a caulking sponge is stuck.

However, the non-drying sealer easily stains the glass run 110 or the door frame 2, and sticking the caulking sponge requires an effort.

As illustrated in FIG. 10, the caulking sponge 150 is partially stuck to the glass run 110, and the side end thereof is inserted between the vehicle outside sidewall 120 and the vehicle outside cover lip 123, so as to reduce the effort of the sticking work (for example, see JP-A-2004-155365). Even in the case, it takes an effort such as a degreasing treatment of the stuck portion of the glass run 110 to stick the caulking sponge 150.

SUMMARY

In this regard, an object of the invention to provide a glass run in which a gap is not formed between a glass run and a door panel in a corner part so as to prevent a wind noise, penetration of rainwater, or the like and to improve a productivity.

According to a first aspect of the invention, there is provided a glass run which is attached in an inner circumference of a door frame of a vehicle door and guides elevating and lowering of a door glass, the glass run including: an extrusion molding part; and a glass run corner part which is connected with the extrusion molding part and is mounted in a door frame corner part, wherein: the extrusion molding part forms a glass run upper side part and a glass run vertical side part; the glass run upper side part is mounted in a door frame upper side part; the glass run vertical side part is mounted in a door frame vertical side part; a main body of the glass run, corresponding to the extrusion molding part and the glass run corner part, has a substantially U-shaped cross section formed by a vehicle outside sidewall, a vehicle inside sidewall, and a bottom wall; the main body is provided with a vehicle outside cover lip extending toward an outside of the vehicle outside sidewall and a vehicle inside cover lip extending toward an outside of the vehicle inside sidewall; the main body is formed with a vehicle outside groove part between the vehicle outside sidewall and the vehicle outside cover lip; the main body is formed with a vehicle inside groove part between the vehicle inside sidewall and the vehicle inside cover lip; tips of a panel of the door frame are inserted into the vehicle outside groove part and the vehicle inside groove part; in the glass run corner part, an engagement bead part is formed in at least one side surface, which faces the vehicle outside groove part, of the vehicle outside sidewall and the vehicle outside cover lip; in the glass run corner part, a long caulking sponge member is inserted into the vehicle outside groove part; and the engagement bead part compresses an end part of the caulking sponge member to be engaged with the end part.

According to the first aspect, the glass run includes the extrusion molding part, and the glass run corner part which is connected with the extrusion molding part and is mounted in the door frame corner part. The extrusion molding part forms the glass run upper side part and the glass run vertical side part, the glass run upper side part is mounted in the door frame upper side part, and the glass run vertical side part is mounted in the door frame vertical side part. For this reason, the sealability can be secured over the entire length of the door frame along the shape of the door frame.

The main body of the extrusion molding part and the glass run corner part of the glass run has the substantially U-shaped cross section formed by the vehicle outside sidewall, the vehicle inside sidewall, and the bottom wall. For this reason, at the time of closing the door, in the door frame upper side part, the door frame vertical side part, and the door frame corner part, the tip and the side end of the door glass can be accommodated inside the glass run having the substantially U-shaped cross section of the main body formed by the vehicle outside sidewall, the vehicle inside sidewall, and the bottom wall, and the door glass can be held reliably.

The vehicle outside cover lip extending toward the outside of the vehicle outside sidewall and the vehicle inside cover lip extending toward the outside of the vehicle inside sidewall are provided to form the vehicle outside groove part between the vehicle outside sidewall and the vehicle outside cover lip and form the vehicle inside groove part between the vehicle inside sidewall and the vehicle inside cover lip, and the tips of the panel of the door frame are inserted into the vehicle outside groove part and the vehicle inside groove part. For this reason, the tips of the door frame are inserted into the vehicle outside groove part and the vehicle inside groove part, the tips of the door frame are interposed by the vehicle outside sidewall and the vehicle outside cover lip, and the vehicle inside sidewall and the vehicle inside cover lip, and the glass run is attached in the door frame.

In the glass run corner part, the engagement bead part is formed in at least one side surface, which faces the vehicle outside groove part, of the vehicle outside sidewall and the vehicle outside cover lip, the long caulking sponge member is inserted into the vehicle outside groove part, and the engagement bead part compresses the end part of the caulking sponge member to be engaged with the end part. For this reason, in the glass run corner part, the gap of the vehicle outside groove pail is closed by the caulking sponge member, thereby preventing the wind noise or the penetration of rainwater. In addition, the end part of the caulking sponge member can be held by the engagement bead part, and the caulking sponge member can be attached only by inserting the caulking sponge member into the vehicle outside groove part. Thus, a degreasing treatment or a primer coating process is not required in which the adhesive is used to stick the caulking sponge member, whereby the attaching work is facilitated.

According to a second aspect of the invention, in the engagement bead part may include bead parts, and the bead parts may be formed in both surfaces, which face the vehicle outside groove part, of the vehicle outside sidewall and the vehicle outside cover lip.

According to the second aspect, the bead parts are formed in the both surfaces, which face the vehicle outside groove part, of the vehicle outside sidewall and the vehicle outside cover lip. Thus, the caulking sponge member can be held by the bead parts of the both sides of the vehicle outside sidewall and the vehicle outside cover lip, the compression margin of the caulking sponge member is enlarged, and the caulking sponge member can be held reliably.

According to a third aspect of the invention, the bead parts may be formed plurally in parallel, and tips of protrusions of the facing bead parts are formed to be deviated.

According to the third aspect, the bead parts which are formed in the both surfaces, which face the vehicle outside groove part, of the vehicle outside sidewall and the vehicle outside cover lip are formed plurally in parallel. For this reason, the caulking sponge member can be held reliably by the plurality of the bead parts formed in the vehicle outside sidewall and the vehicle outside cover lip.

The plurality of vehicle outside bead parts which are formed to face the both surfaces of the vehicle outside sidewall and the vehicle outside cover lip are formed such that the tips of the protrusions of the facing vehicle outside bead parts are deviated from each other. For this reason, the tips of the protrusions of the facing bead parts can be positioned in the gap between the plural vehicle outside bead parts and the plural vehicle outside bead parts which are in parallel. The caulking sponge member can be held in a zigzag shape in the facing bead parts, and the caulking sponge member can be held firmly. In addition, it is possible to maintain the high strength of the die which molds the vehicle outside groove part of the corner part.

According to a fourth aspect of the invention, the engagement bead part may be formed to be inclined with respect to an axial direction of the extrusion molding part which is connected with the glass run corner part.

According to the fourth aspect, the engagement bead part is formed to be inclined with respect to the axial direction of the extrusion molding part which is connected with the glass run corner part. Thus, in the end part of the caulking sponge member, it is possible to improve the resistance force with respect to the tensile force in the outer circumferential direction of the corner part 12, and to improve a holding force of the caulking sponge member.

According to a fifth aspect of the invention, the engagement bead part may be formed in a vicinity of a connection surface of the glass run corner part with the extrusion molding part.

According to the fifth aspect, the engagement bead part is formed in the vicinity of the connection surface of the glass run corner part with the extrusion molding part. Thus, the resistance force can be strengthened with respect to the tensile force of the end part of the caulking sponge member, and the strength of the die which molds the vehicle outside groove pail of the corner part of the glass run can be enlarged.

According to a sixth aspect of the invention, a seal bead part may be formed in at least one side surface of the vehicle outside sidewall and the vehicle outside cover lip of the extrusion molding part, a joint portion of the vehicle outside sidewall or the vehicle outside cover lip of the glass run corner part, connected with the vehicle outside sidewall or the vehicle outside cover lip formed with the seal bead part, may be provided with a seal bead part connected with the seal bead part of the extrusion molding part, and the seal bead part of the glass run corner part may compress both end parts of the caulking sponge member to be engaged with the end parts.

According to the sixth aspect, the seal bead part is formed in at least one surface of the vehicle outside sidewall and the vehicle outside cover lip of the extrusion molding part. For this reason, the seal bead part abuts on the door outer panel, so as to seal a space between the door outer panel and the vehicle outside groove part of the glass run in the extrusion molding part.

The joint portion of the vehicle outside sidewall or the vehicle outside cover lip of the glass run corner part which is connected with the vehicle outside sidewall or the vehicle outside cover lip which is formed with the seal bead part is provided with the seal bead part which is connected with the seal bead part of the extrusion molding part, and the seal bead part of the glass run corner part compresses both end parts of the caulking sponge member to be engaged with the end parts. For this reason, the seal bead part of the extrusion molding part and the seal bead part of the glass run corner part can continuously perform the sealing, and the sealing is not interrupted in the connecting portion between the extrusion molding part and the glass run corner part.

According to a seventh aspect of the invention, an engagement bead part may be formed in at least one side surface of the vehicle inside sidewall and the vehicle inside cover lip of the vehicle inside groove part of the glass run corner part, a long caulking sponge member may be inserted into the vehicle inside groove part, and the engagement bead part may compress both end parts of the caulking sponge member to be engaged with the end parts.

According to the seventh aspect, the engagement bead part is formed in at least one surface of the vehicle inside sidewall and the vehicle inside cover lip of the vehicle inside groove part of the glass run corner part, the long caulking sponge member is inserted into the vehicle inside groove part, and the engagement bead part compresses both end parts of the caulking sponge member to be engaged with the end parts. For this reason, the gap of the vehicle inside groove part in the glass run corner part can be closed by the caulking sponge member, thereby preventing the wind noise or the penetration of rainwater. In addition, in cooperation with the caulking sponge member of the vehicle outside groove part, the sealability of the glass run corner part can be improved. In addition, the both end parts of the caulking sponge member can be held by the engagement bead part, and the caulking sponge member can be attached only by inserting the caulking sponge member into the vehicle inside groove part, whereby the attaching work is facilitated.

In the glass run corner part, the engagement bead part is formed in at least one surface, which faces the vehicle outside groove part, of the vehicle outside sidewall and the vehicle outside cover lip, the long caulking sponge member is inserted into the vehicle outside groove part, and the engagement bead part compresses the end part of the caulking sponge member to be engaged with the end part. For this reason, the both end parts of the caulking sponge member can be held by the engagement bead part, and the caulking sponge member can be attached only by inserting the caulking sponge member into the vehicle outside groove part, whereby the attaching work is facilitated.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

An embodiment of the invention will be described on the basis of FIGS. 1 to 9.

Figure 8:
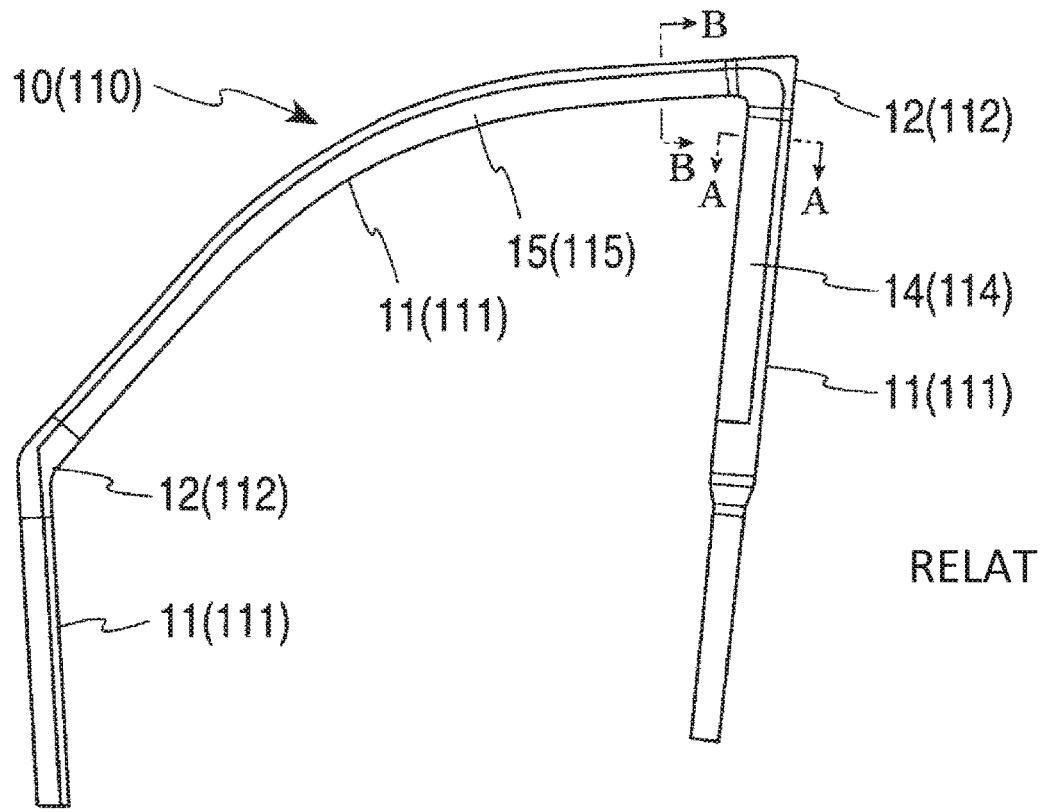
FIG. 8 is a front view of the glass run used in the embodiment of the invention.
Figure 9:
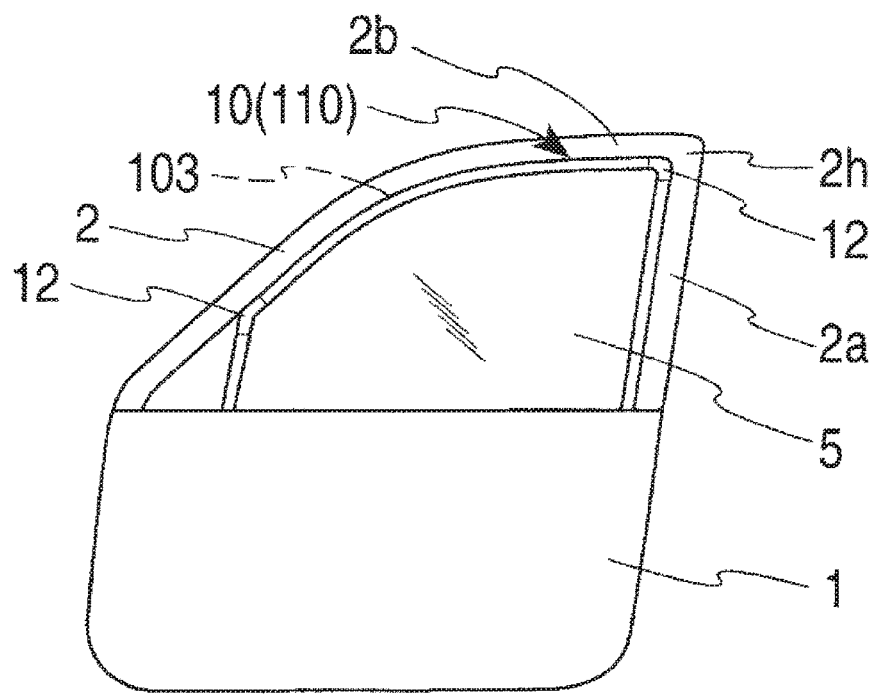
FIG. 9 is a front view of a vehicle door.
Figure 10:
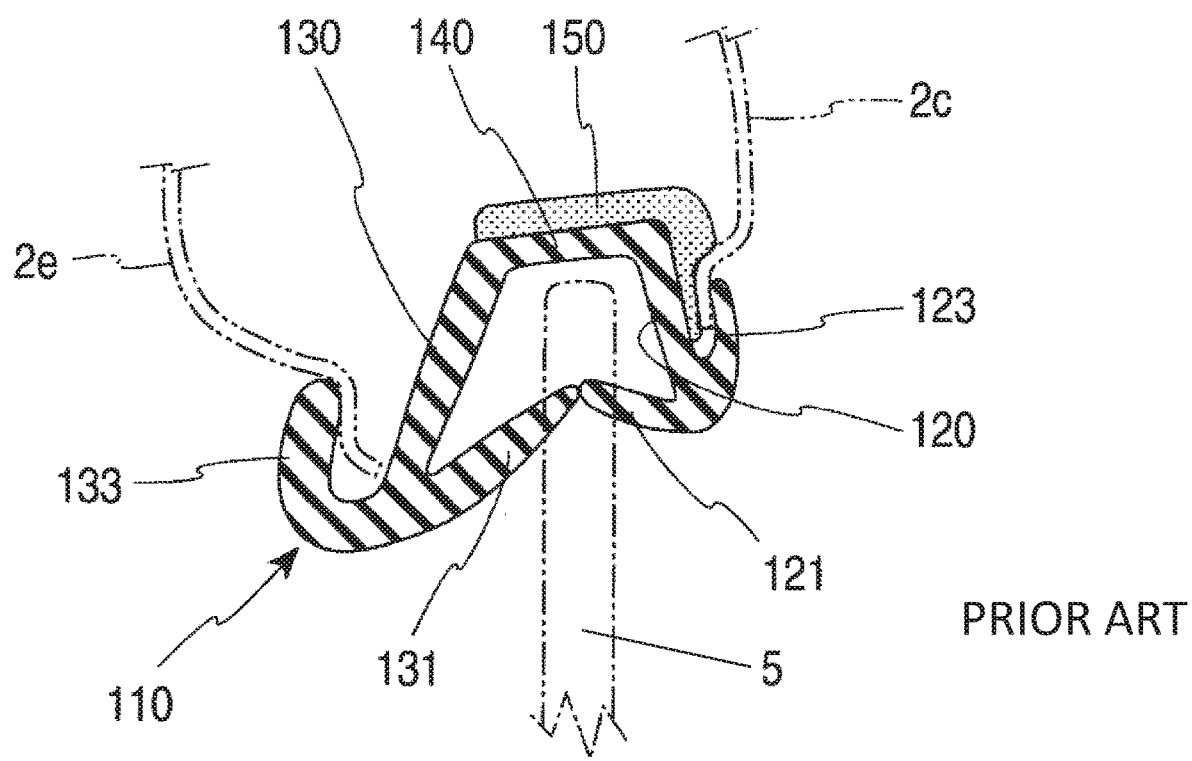
FIG. 10 is a sectional view illustrating a state where a conventional glass run is mounted in the corner part.

FIG. 9 is a front view of a door 1 on a front side of a vehicle, and FIG. 8 is a front view of a glass run 10 of a front door attached in a door frame 2 of the door 1. As illustrated in FIG. 9, the door frame 2 is provided in the upper portion of the door 1, and the door glass 5 is attached to be freely elevated and lowered. That is, the glass run 10 is attached in the inner circumference of the door frame 2, so as to guide the elevating and lowering of the door glass 5 and seal a space between the door glass 5 and the door frame 2.

As illustrated in FIG. 8, the glass run 10 includes an extrusion molding part 11 formed overall by extrusion molding and a glass run corner part 12 which is attached in a door frame corner part 2h of the door frame 2 and is formed to be connected with the extrusion molding part 11 by die molding.

The extrusion molding part 11 includes a glass run upper side part 15 attached in a door frame upper side part 2h of the door frame 2, a glass run vertical side part 14 attached in a door frame vertical side part 2a which is a vertical side part on a rear side of the door frame 2, and a portion attached in a division sash forming the front vertical side part of the door frame 2.

In order that these extrusion molding parts have shapes corresponding to the door frame 2, in the respective corner portions of the front side and the rear side, the glass run corner part 12 is formed by being molded by the die molding and connecting the glass run upper side part 15 and the glass run vertical side part 14. Incidentally, the glass run corner part 12 on the rear side is mounted in the portion of the door frame corner part 2h.

Hereinafter, as for the invention, the description will be given by exemplifying the glass run upper side part 15 and the glass run vertical side part 14 of the extrusion molding part 11 and the glass run corner part 12 which are mounted in the door frame corner part 2h as a rear corner part formed by the door frame vertical side part 2a, which is a rear vertical side part of the front door 1, and the door frame upper side part 2b. The invention can be applied to the front corner part of the door 1 on the front side and the corner part of the door 1 on the rear side.

Figure 6:
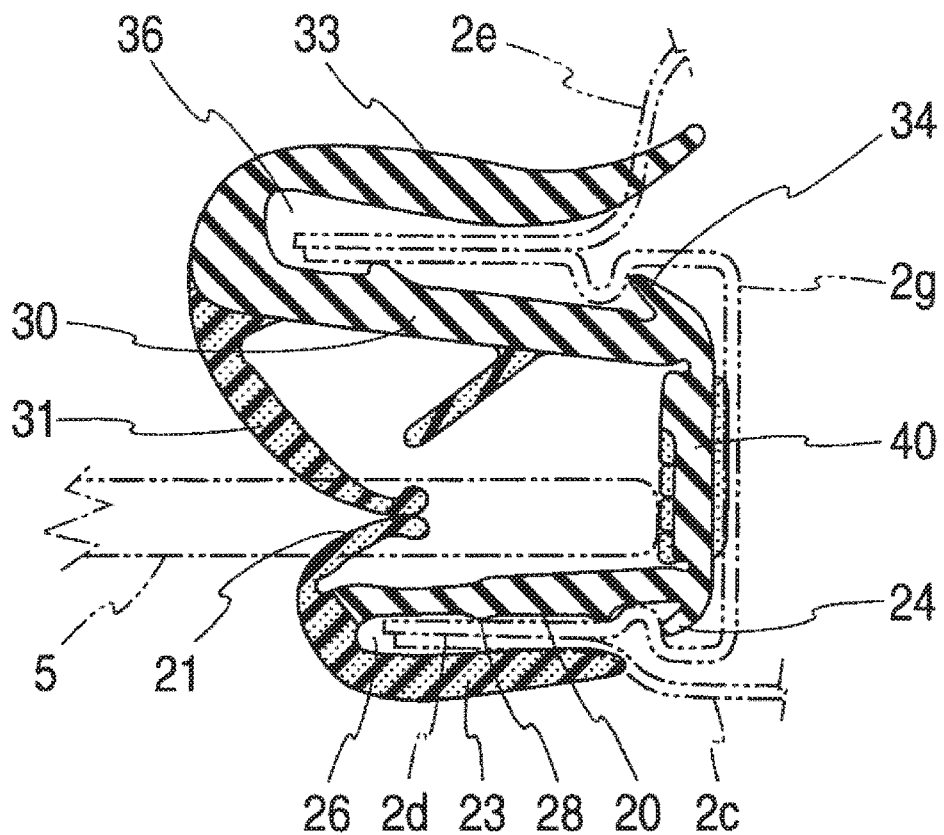
FIG. 6 is a sectional view of a vertical side part of the glass run of the embodiment of the invention, and is a sectional view taken along line A-A in FIG. 8.
Figure 7:
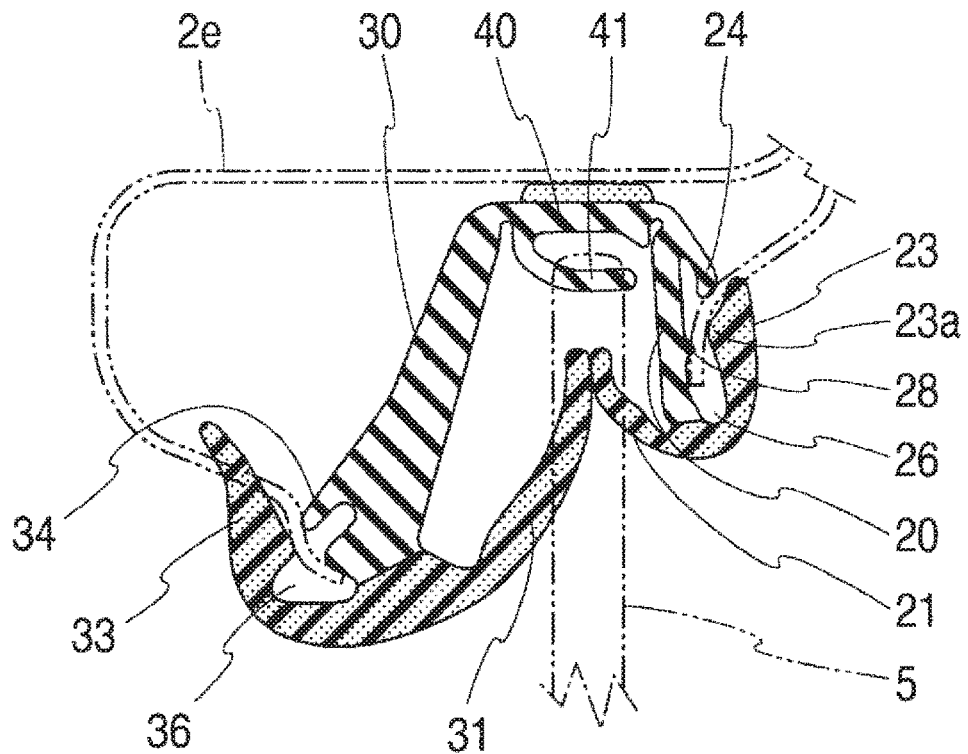
FIG. 7 is a sectional view of the upper side part of the glass run of the embodiment of the invention, and is a sectional view taken along line B-B in FIG. 8.

FIG. 6 is a sectional view of the glass run vertical side part 14 when taken along line A-A of FIG. 8, and FIG. 7 is a sectional view of the glass run upper side part 15 when taken along line B-B of FIG. 8. First, the glass run vertical side part 14 and the glass run upper side part 15 of the glass run 10 will be described, and then the glass run corner part 12 will be described.

As illustrated in FIG. 6, the glass run vertical side part 14 of the glass rim 10 is formed such that the main body has a substantially U-shaped cross section by a vehicle outside sidewall 20, a vehicle inside sidewall 30, and a bottom wall 40. As described above, the vehicle inside sidewall 30 is formed to be larger and thicker than the vehicle outside sidewall 20, and the substantially U-shaped cross section is formed in an asymmetrical shape of which the vehicle inside is large.

In the main body of the glass run 10, the portion attached in the upper side part of the door frame 2 and the portion attached in the vertical side part basically have a cross section formed in substantially U-shape and almost similar to each other.

The vehicle outside sidewall 20 of the glass run 10 is formed to have a substantially plate-shaped cross section.

The vehicle outside seal lip 21 from the vicinity of the tip of the vehicle outside sidewall 20 is provided to extend toward the inside of the substantially U-shaped cross section of the main body. In addition, the vehicle outside cover lip 23 is provided to extend from the tip of the vehicle outside sidewall 20 in a vehicle outside direction with a tip part 2d of the door outer panel 2c interposed between the vehicle outside sidewall 20 and the vehicle outside cover lip 23.

A vehicle outside groove part 26 is formed by the vehicle outside sidewall 20 and the vehicle outside cover lip 23. A vehicle outside seal bead part 28 which abuts on the tip part 2d of the door outer panel 2c is formed inside the vehicle outside groove part 26. In this embodiment, the vehicle outside seal bead part 28 is formed in a surface on the vehicle outside sidewall 20, but may be formed in a surface on the vehicle outside cover lip 23.

A vehicle outside holding lip 24 is formed in the outer surface of the vehicle outside sidewall 20. The channel 2g is attached between the tip of the door outer panel 2c and the tip of the door inner panel 2e, the vehicle outside holding lip 24 is locked in the bent portion of the channel 2g, and the vehicle outside sidewall 20 can be held by the door outer panel 2c.

On the inside of the vehicle outside sidewall 20, the vehicle outside seal lip 21 obliquely is provided to extend toward the inside of the main body of the glass run 10.

When the side end of the door glass 5 is elevated and lowered inside the glass run vertical side part 14 of the main body of the glass run 10, the vehicle outside seal lip 21 and a vehicle inside seal lip 31 (to be described later) elastically abuts on both surfaces of the side end of the door glass 5, so as to seal a space between the side end of the door glass 5 and the door frame 2.

A low sliding member may be provided in the surface of the vehicle outside seal lip 21 and the vehicle inside seal lip 31. In this case, the contact area or the friction resistance between the door glass 5 and the glass run 10 at the time of elevating and lowering the door glass 5 to be slid on the glass run 10 of the vertical side part is decreased. Thus, the sliding resistance can be reduced to prevent a noise, and a smooth elevating and lowering can be secured. Further, even when the door glass 5 is moved and bent to the vehicle outside by a curvature of the door glass 5 during the elevating and lowering and by the negative pressure during traveling, so as to be strongly pushed by the vehicle outside seal lip 21, a smooth elevating and lowering can be secured without increasing the sliding resistance of the door glass 5.

The bottom wall 40 is formed in a substantially plate shape, and the groove part is formed such that a continuous portion between the vehicle inside sidewall 30 and the vehicle outside sidewall 20 can be bent easily.

In the inner surface of the substantially U-shaped cross section of the main body of the glass run 10 of the bottom wall 40, the low sliding member is extrusion-molded similarly to the vehicle outside seal lip 21 and the vehicle inside seal lip 31, or the low sliding member such as urethane resin is coated. For this reason, the sliding resistance against the door glass 5 can be reduced.

The vehicle inside sidewall 30 is formed to be thicker and larger than the vehicle outside sidewall 20. For this reason, the glass run 10 can be held by the side surface of the door frame 2.

The vehicle inside cover lip 33 is provided to extend in parallel to the vehicle inside sidewall 30 from the tip of the vehicle inside sidewall 30 to the outer surface side of the vehicle inside sidewall 30, that is, in a vehicle inside direction. The flange portion where the tip of the door inner panel 2e is joined with the tip of the channel 2g is interposed between the vehicle inside cover lip 33 and the vehicle inside sidewall 30.

A vehicle inside groove part 36 is formed by the vehicle inside sidewall 30 and the vehicle inside cover lip 33.

Similarly to the vehicle outside sidewall 20, the vehicle inside seal lip 31 is provided to extend from the tip of the vehicle inside sidewall 30 obliquely in an inside direction of the main body of the glass run 10. Since the vehicle inside seal lip 31 is formed to be longer and thicker than the vehicle outside seal lip 21, when the door glass 5 invades the glass run 10, the door glass 5 can be positioned on the vehicle outside, and a step difference between the door frame 2 and the door glass 5 can be lessened. For this reason, an air resistance or a wind noise is reduced, and a design is also unproved.

In the outer surface of the vehicle inside sidewall 30, a vehicle inside holding lip 34 is formed near the continuous portion with the bottom wall 40. In the channel 2g of the door frame 2, a convex part is formed to be bent, and the vehicle inside holding lip 34 is locked in the convex part. For this reason, the glass run 10 can be held by the door frame 2.

Next, the glass run upper side part 15 will described on the basis of FIG. 7. In the glass run upper side part 15, the vehicle outside sidewall 20, the vehicle outside seal lip 21, the vehicle outside cover lip 23, and the vehicle outside holding lip 24 are almost the same as the glass run vertical side part 14. The vehicle inside sidewall 30, the vehicle inside seal lip 31, the vehicle inside cover lip 33, and the vehicle inside holding lip 34 are almost the same as the glass run vertical side part 14. Herein, the vehicle inside holding lip 34 is locked in the bent portion of the door inner panel 2e.

The vehicle outside groove part 26 is formed by the vehicle outside sidewall 20 and the vehicle outside cover lip 23, and the vehicle inside groove part 36 is formed by the vehicle inside sidewall 30 and the vehicle inside cover lip 33.

A bottom wall lip 41 is provided in the bottom wall 40, and the bottom wall lip 41 abuts on the door glass 5 at the time of elevating of the door glass, so as to perform a cushioning function. The vehicle outside seal bead part 28 is formed in the side surface of the vehicle outside sidewall 20 facing the vehicle outside groove part 26.

Next, the glass run corner part 12 will be described on the basis of FIGS. 1 to 5.

The glass run corner part 12 connects the glass run upper side part 15 and the glass run vertical side part 14 to each other by die molding. Also in the glass run corner part 12, the vehicle outside sidewall 20, the vehicle outside seal lip 21, and the vehicle outside cover lip 23 are almost the same as those of the glass run vertical side part 14. The vehicle inside sidewall 30, the vehicle inside seal lip 31, and the vehicle inside cover lip 33 are also almost the same as those of the glass run vertical side part 14.

That is, the connected portion of the glass run corner part 12 with the glass run upper side part 15 has the same cross section as the glass run upper side part 15, and the connected portion with the glass run vertical side part 14 has the same cross section as the glass run vertical side part 14. The connected portions are gradually changed in a central direction of the glass run corner pan 12 so as to connect the cross sections on both sides.

The vehicle outside groove part 26 is formed by the vehicle outside sidewall 20 and the vehicle outside cover lip 23, and the vehicle inside groove part 36 is formed by the vehicle inside sidewall 30 and the vehicle inside cover lip 33.

For this reason, in the glass run corner part 12, the vehicle outside sidewall 20, the vehicle outside seal lip 21, the vehicle outside cover lip 23, the vehicle inside sidewall 30, the vehicle inside seal lip 31, the vehicle inside cover lip 33, the vehicle outside groove part 26, and the vehicle inside groove part 36 have the same shape as those of the glass run upper side part 15 and the glass run vertical side part 14, so that the connection is performed easily.

Figure 3:
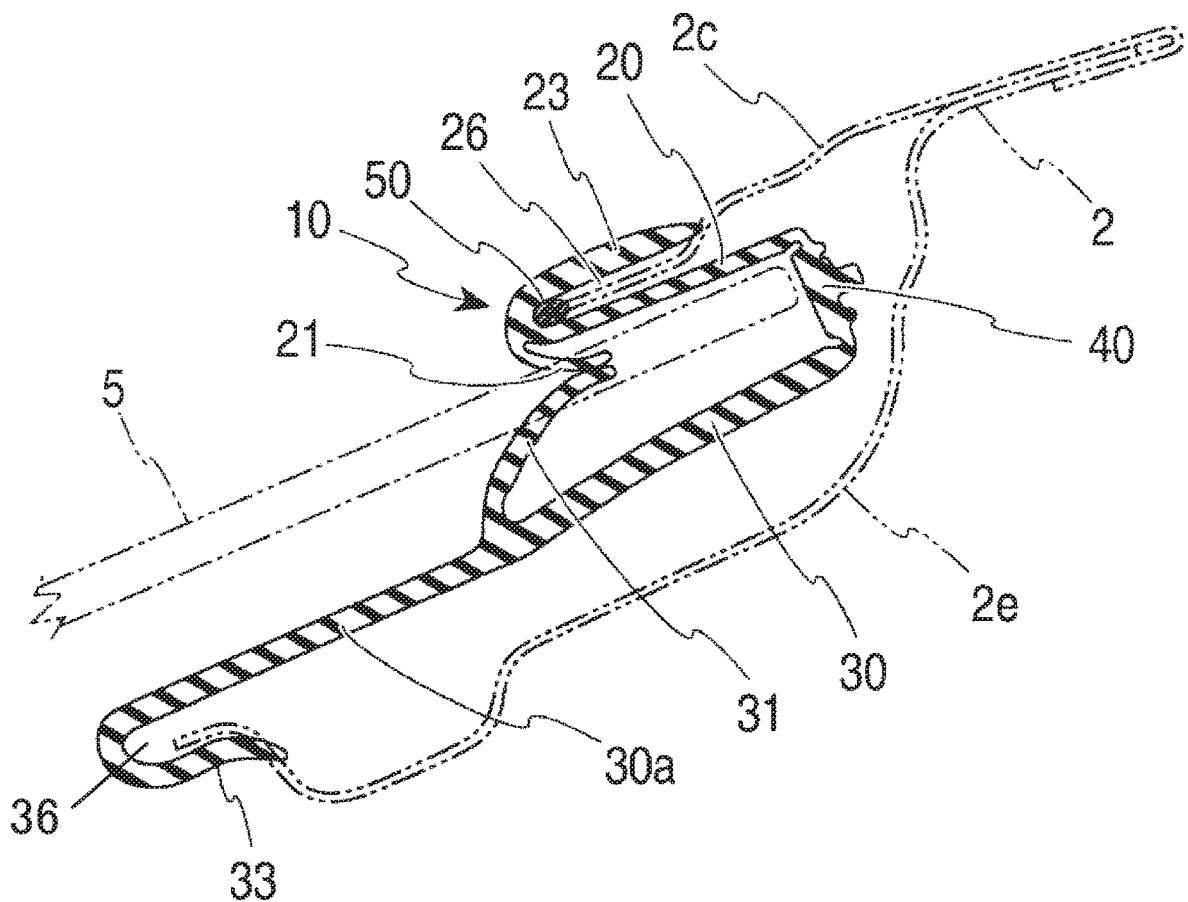
FIG. 3 is a sectional view of the corner part of the glass run of the embodiment of the invention, and is a sectional view taken along line C-C in FIG. 1.

Herein, in the vehicle outside sidewall 20 and the vehicle inside sidewall 30, the bent portion of the glass run corner part 12 is formed to be long so as to cover the door frame corner part. Particularly, as illustrated in FIG. 3, in the vehicle inside sidewall 30, a vehicle inside wall extension part 30a is formed to be longer than the portion where the vehicle inside seal lip 31 is provided to extend.

Figure 1:
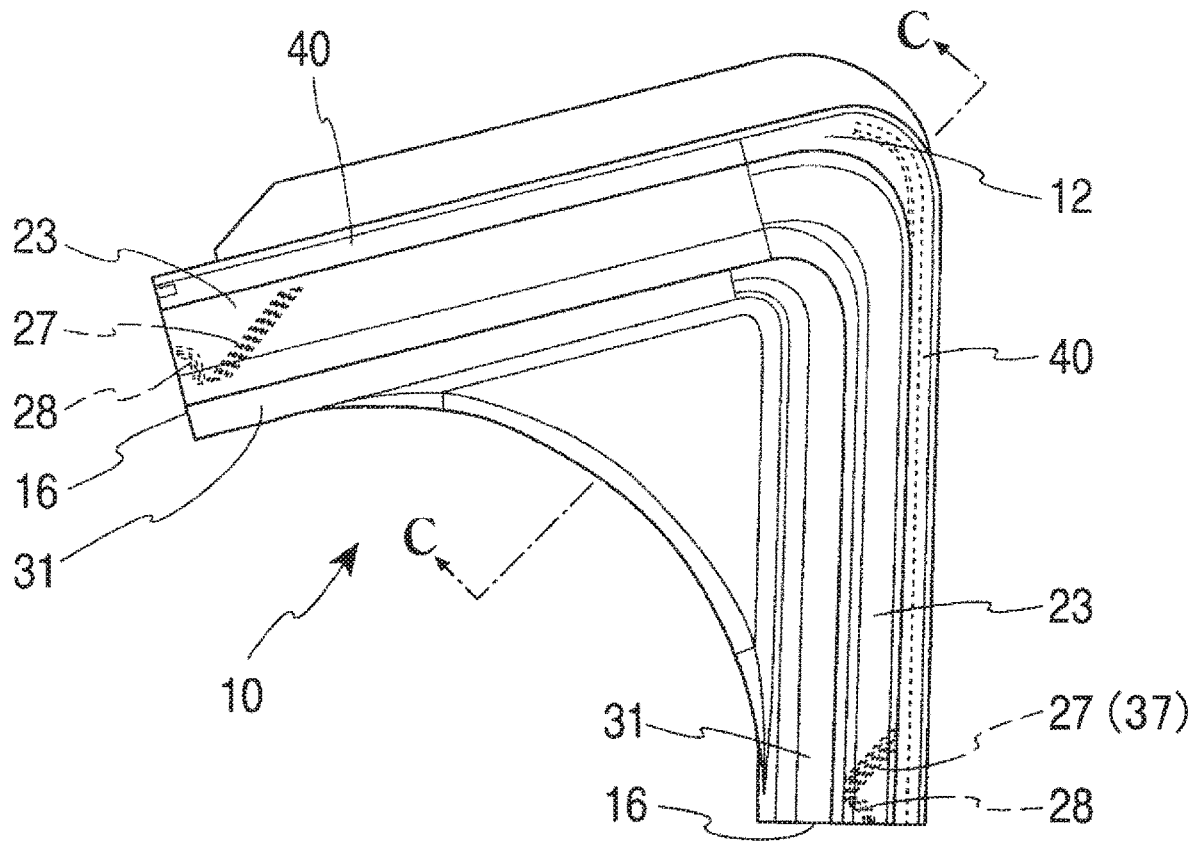
FIG. 1 is a front view of a corner part of a glass run of an embodiment of the invention.
Figure 4:
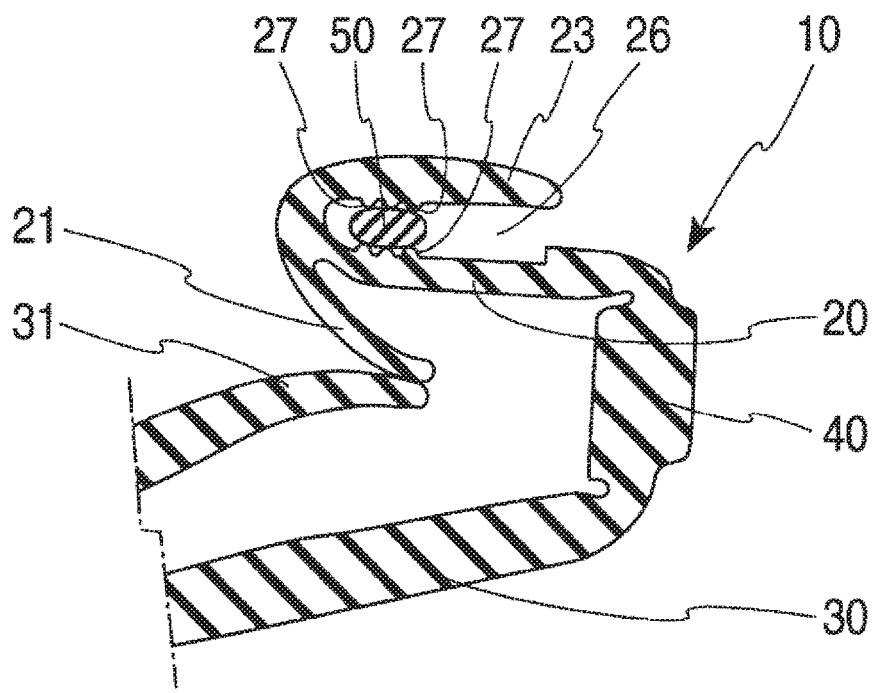
FIG. 4 is a sectional view of the corner part of the glass run of the embodiment of the invention, and is an enlarged sectional view of the vehicle outside sidewall and the vehicle outside cover lip portion.

As illustrated in FIGS. 1 and 4, in the glass run corner part 12, a vehicle outside engagement bead part 27 is formed in at least one surface, which faces the vehicle outside groove part 26, of the vehicle outside sidewall 20 and the vehicle outside cover lip 23. In this embodiment, the vehicle outside engagement bead parts 27 are formed on both sides of the vehicle outside sidewall 20 and the vehicle outside cover lip 23, but may be formed in any one thereof.

As illustrated in FIG. 1, the vehicle outside engagement bead parts 27 are formed in the vicinity of connection surfaces 16 of the glass run corner part 12 with the glass run vertical side part 14 and the glass run upper side part 15.

The vehicle outside engagement bead parts 27 are formed in the vicinity of the connection surface 16 of the glass run corner part 12 with the glass run vertical side part 14 and the glass run upper side part 15 which are an extrusion molding parts. Thus, it is possible to strengthen a resistance force with respect to a tensile force of an end part of a caulking sponge member 50 and to prevent the strength reduction of the die which molds the glass run corner part 12.

As described above, the long caulking sponge member 50 is inserted into the vehicle outside groove part 26, and both end parts of the caulking sponge member 50 are compressed by the vehicle outside engagement bead parts 27 in the vicinity of the connection surface 16 of the glass run vertical side part 14 and the glass run upper side part 15, so that the caulking sponge member is engaged in the vehicle outside groove part 26. For this reason, in the glass run corner part 12, the gap of the vehicle outside groove part 26 is closed by the caulking sponge member 50, so as to prevent the wind noise or the penetration of rainwater.

The caulking sponge member 50 may be formed to have a circular, elliptic, or polygonal cross section.

The both end parts of the caulking sponge member 50 can be held by the vehicle outside engagement bead parts 27, and the caulking sponge member 50 can be attached only by inserting the caulking sponge member 50 into the vehicle outside groove part 26. Thus, a degreasing treatment or an primer coating process is not required in which the adhesive is used to stick the caulking sponge member 50, whereby the attaching work is facilitated, and a prime cost becomes low. In addition, the caulking sponge member 50 can be held over the entire length.

In a case where the vehicle outside engagement bead parts 27 are formed in the both surfaces, which face the vehicle outside groove part 26, of the vehicle outside sidewall 20 and the vehicle outside cover lip 23, the caulking sponge member 50 can be interposed between the vehicle outside engagement bead parts 27 of the both sides of the vehicle outside sidewall 20 and the vehicle outside cover lip 23, the compression margin of the caulking sponge member 50 is enlarged, and the caulking sponge member 50 can be held reliably.

Incidentally, even in a case where the vehicle outside engagement bead part 27 is formed in at least one surface, which faces the vehicle outside groove part 26, of the vehicle outside sidewall 20 and the vehicle outside cover lip 23, the vehicle outside engagement bead part 27 can hold the caulking sponge member 50.

The vehicle outside engagement bead parts 27 which are formed in both surfaces, which face the vehicle outside groove part 26, of the vehicle outside sidewall 20 and the vehicle outside cover lip 23 are formed plurally in parallel. For this reason, the caulking sponge member 50 can be held reliably by the plurality of the vehicle outside engagement bead parts 27 formed in the vehicle outside sidewall 20 and the vehicle outside cover lip 23.

The vehicle outside engagement bead parts 27 are each formed plurally in parallel and face each other. The vehicle outside engagement bead part may be formed to be deviated from the facing vehicle outside engagement bead part 27. That is, the plurality of vehicle outside engagement bead parts 27 which are formed to face the both surfaces of the vehicle outside sidewall 20 and the vehicle outside cover lip 23 are formed such that the tips of the protrusions of the facing vehicle outside engagement bead parts 27 are deviated from each other.

For this reason, the tips of the protrusions of the facing vehicle outside engagement bead parts 27 can be positioned in the gap between the plural vehicle outside engagement bead parts 27 and the plural vehicle outside engagement bead part 27 which are in parallel. The caulking sponge member 50 can be held in a zigzag shape in the facing vehicle outside engagement bead parts 27, and the caulking sponge member 50 can be held firmly. In addition, it is possible to maintain the high strength of the die which molds the vehicle outside groove part 26 of the glass run corner part 12.

As illustrated in FIG. 1, the vehicle outside engagement bead parts 27 are formed to be inclined with respect to the respective axial directions of the glass run vertical side part 14 and the glass run upper side part 15 which are the connected extrusion molding parts. For this reason, in the end part of the caulking sponge member 50, it is possible to improve the resistance force with respect to the tensile force in the outer circumferential direction of the glass run corner part 12.

Besides, as same as providing the vehicle outside engagement bead parts 27 in the vehicle outside groove part 26, a vehicle inside engagement bead part 37 can be provided in the vehicle inside groove part 36 in the vicinity of the connection surface 16.

As illustrated in FIGS. 6 and 7, the vehicle outside seal bead part 28 is formed in the surface of the vehicle outside sidewall 20 on the vehicle outside groove part 26 side in the glass run vertical side part 14 and the glass run upper side part 15 which are the extrusion molding parts of the glass run 10.

As described above, the vehicle outside seal bead part 28 can be formed in at least one surface of the vehicle outside sidewall 20 and the vehicle outside cover p 23. In this case, the vehicle outside seal bead part 28 can abut on the door outer panel 2c, so as to seal a space between the door outer panel 2c and the vehicle outside groove part 26 of the glass run 10 in the glass run vertical side part 14 and the glass run upper side part 15.

Figure 5:
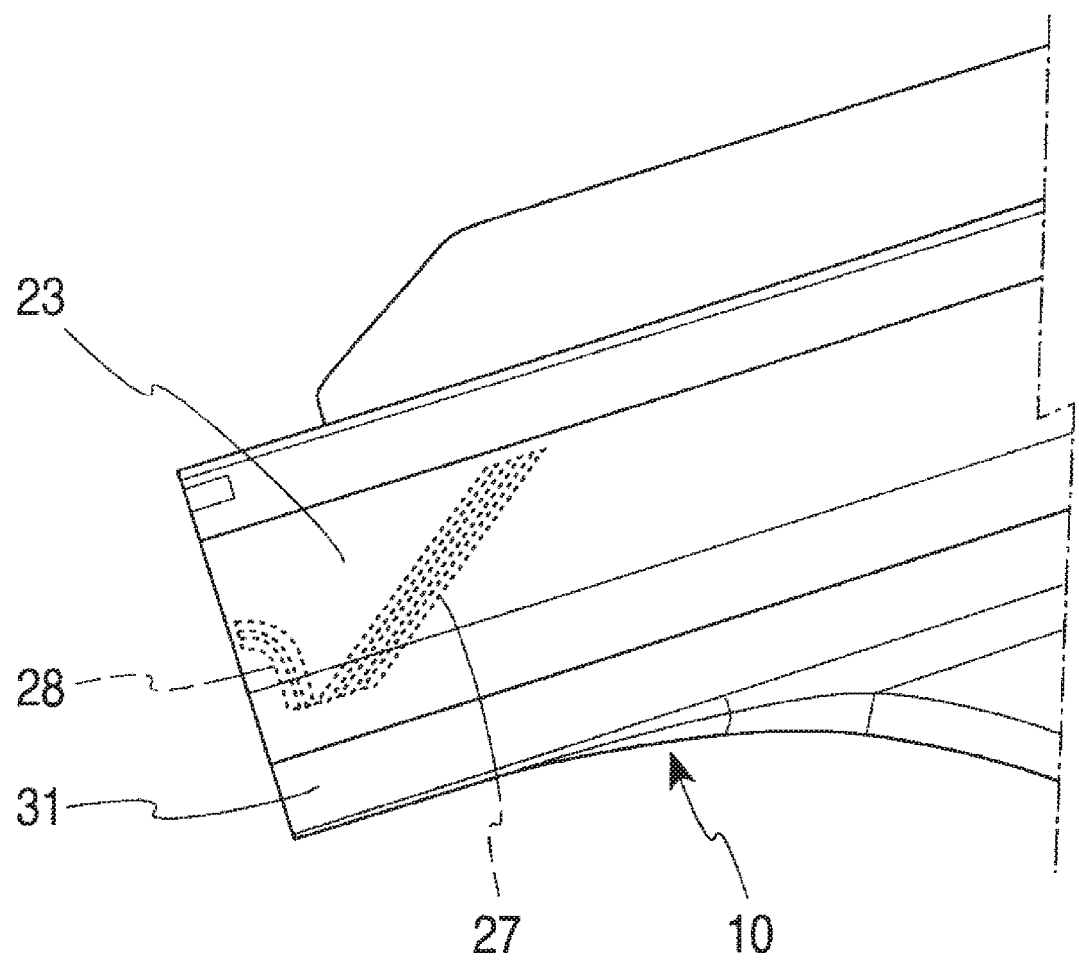
FIG. 5 is a front view of the corner part of the glass run of the embodiment of the invention, and is an enlarged front view of a connecting portion with an upper side part of the glass run.

As illustrated in FIG. 5, the vehicle outside seal bead part 28 is provided in the vicinity of the connection surface 16 of the glass run corner part 12 with the glass run vertical side part 14 and the glass run upper side part 15, so as to be connected with the vehicle outside seal bead part 28 of the vehicle outside sidewall 20 in the glass run vertical side part 14 and the glass run upper side part 15. The vehicle outside seal bead parts 28 in the glass run corner part 12 and the vehicle outside sidewall 20 are provided to be continuous.

The vehicle outside seal bead part 28 of the glass run corner part 12 is formed to be bent to approach the vehicle outside engagement bead part 27.

The vehicle outside seal bead parts 28 of the glass run corner part 12 compress the both end parts of the caulking sponge member 50 to be engaged therewith. For this reason, the vehicle outside seal bead part 28 of the glass run vertical side part 14 and the glass run upper side part 15 and the vehicle outside seal bead part 28 of the glass run corner part 12 can continuously seal a space from the door outer panel 2c. The sealing is not interrupted in the connecting portions between the glass run vertical side part 14 and the glass run upper side part 15, and the glass run corner part 12.

Figure 2:
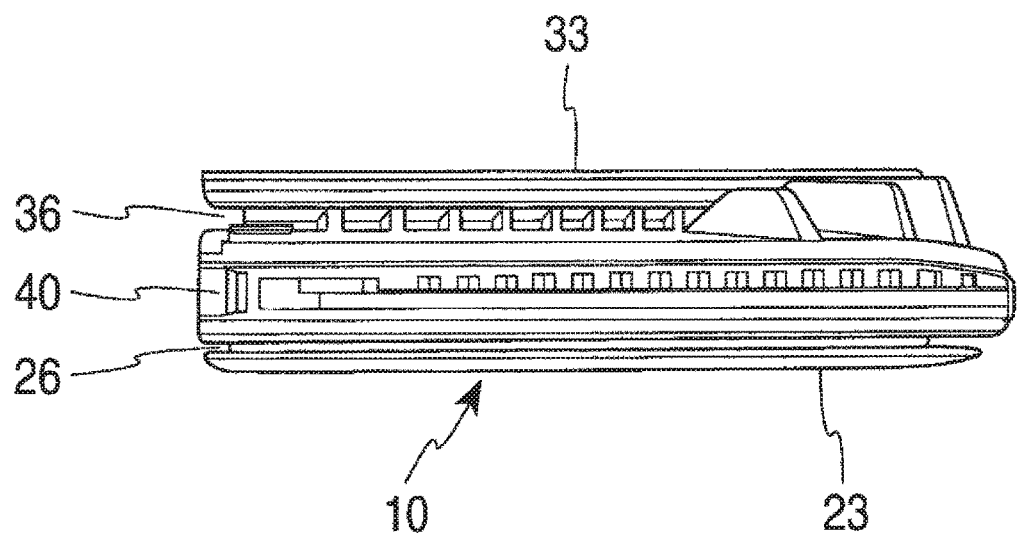
FIG. 2 is a plan view of the corner part of the glass run of the embodiment of the invention.

As illustrated in FIG. 2, similarly the vehicle outside groove part 26 of the glass run corner part 12, a vehicle inside engagement bead part 37 is formed in at least one side surface of the vehicle inside sidewall 30 and the vehicle inside cover lip 33 of the vehicle inside groove part 36. In this case, the long caulking sponge member 50 is inserted into the vehicle inside groove part 36, and the vehicle inside engagement bead parts 37 compress the both end parts of the caulking sponge member 50 to be engaged therewith.

Accordingly, the gap of the vehicle inside groove part 36 in the glass run corner part 12 can be closed by the caulking sponge member 50, thereby preventing the wind noise or the penetration of rainwater. In addition, the both end parts of the caulking sponge member 50 can be held in the vehicle inside engagement bead parts (not illustrated), and the caulking sponge member 50 can be attached only by inserting the caulking sponge member 50 into the vehicle inside groove part 36, whereby the attaching work is facilitated.

Similarly to the glass run vertical side part 14 and the glass run upper side part 15 which are the extrusion molding part of the glass run 10, the main body of the glass run corner part 12 is provided with the vehicle outside seal lip 21 and the vehicle inside seal lip 31 which each extend toward the inside of the substantially U-shaped cross section of main body, and the vehicle outside surface and the vehicle inside surface of the door glass 5 are sealed by the vehicle outside seal lip 21 and the vehicle inside seal lip 31.

For this reason, in the glass run vertical side part 14, the glass run upper side part 15, and the glass run corner part 12 of the glass run 10, the seal lips on both sides abut on the door glass 5 by the vehicle outside seal lip 21 and the vehicle inside seal lip 31 according to the elevating and lowering of the door glass 5, and the space between the door frame 2 and the door glass 5 is sealed by the vehicle outside seal lip 21 and the vehicle inside seal lip 31.

What is claimed is:

1. A glass run which is attached in an inner circumference of a door frame of a vehicle door and guides elevating and lowering of a door glass, the glass run comprising:
    an extrusion molding part; and
    a glass run corner part which is connected with the extrusion molding part and is mounted in a door frame corner part, wherein:
    the extrusion molding part forms a glass run upper side part and a glass run vertical side part;
    the glass run upper side part is mounted in a door frame upper side part;
    the glass run vertical side part is mounted in a door frame vertical side part;
    a main body of the glass run, corresponding to the extrusion molding part and the glass run corner part, has a substantially U-shaped cross section formed by a vehicle outside sidewall, a vehicle inside sidewall, and a bottom wall;
    the main body is provided with a vehicle outside cover lip extending toward an outside of the vehicle outside sidewall and a vehicle inside cover lip extending toward an outside of the vehicle inside sidewall;
    the main body is formed with a vehicle outside groove part between the vehicle outside sidewall and the vehicle outside cover lip;
    the main body is formed with a vehicle inside groove part between the vehicle inside sidewall and the vehicle inside cover lip;
    tips of panels of the door frame are inserted into the vehicle outside groove part and the vehicle inside groove part;
    in the glass run corner part, an engagement bead part is formed on at least one side surface, which faces the vehicle outside groove part, of the vehicle outside sidewall and the vehicle outside cover lip;
    in the glass run corner part, a caulking sponge member is inserted into the vehicle outside groove part; and
    the engagement bead part compresses an end part of the caulking sponge member to be engaged with the end part.

2. The glass run according to claim 1, wherein:
    the engagement bead part includes a first plurality of bead parts formed on a side surface of the vehicle outside sidewall and a second plurality of bead parts formed on a side surface of the vehicle outside cover lip; and
    both the first plurality of bead parts and the second plurality of bead parts face the vehicle outside groove part.

3. The glass run according to claim 2, wherein:
    the first plurality of bead parts extend from the side surface of the vehicle outside sidewall in parallel;

the second plurality of bead parts extend from the side surface of the vehicle outside cover lip in parallel; and a tip of at least one of the first plurality of bead parts is positioned in a gap between two of the second plurality of bead parts, and a tip of at least on the second plurality of bead parts is positioned in a gap between two of the first plurality of bead parts.

4. The glass run according to claim 1, wherein the engagement bead part is formed to be inclined with respect to an axial direction of the extrusion molding part which is connected with the glass run corner part.

5. The glass run according to claim 1, wherein the engagement bead part is formed in a vicinity of a connection surface of the glass run corner part with the extrusion molding part.

6. The glass run according to claim 1, wherein:

a seal bead part is formed on at least one side surface of the vehicle outside sidewall and the vehicle outside cover lip of the extrusion molding part;

a joint portion of the vehicle outside sidewall or the vehicle outside cover lip of the glass run corner part, which is connected with the vehicle outside sidewall or the vehicle outside cover lip formed with the seal bead part thereon, is provided with another seal bead part that is connected with the seal bead part of the extrusion molding part; and the another seal bead part of the glass run corner part compresses both end parts of the caulking sponge member to be engaged with the end parts.

7. The glass run according to claim 1, wherein:

another engagement bead part is formed in at least one side surface of the vehicle inside sidewall and the vehicle inside cover lip of the vehicle inside groove part of the glass run corner part;

a caulking sponge member is inserted into the vehicle inside groove part; and the another engagement bead part compresses both end parts of the caulking sponge member to be engaged with the end parts.

* * * * *